United States Patent
Lee et al.

(10) Patent No.: US 12,259,019 B2
(45) Date of Patent: Mar. 25, 2025

(54) SHOCK ABSORBER

(71) Applicant: HL MANDO CORPORATION, Pyeongtaek-si (KR)

(72) Inventors: Seungjoon Lee, Seoul (KR); Kwangduk Baek, Yongin-si (KR); Juyoung Hwang, Iksan-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 227 days.

(21) Appl. No.: 17/824,344

(22) Filed: May 25, 2022

(65) Prior Publication Data
US 2022/0381314 A1    Dec. 1, 2022

(30) Foreign Application Priority Data
May 25, 2021   (KR) .................. 10-2021-0067058

(51) Int. Cl.
| | |
|---|---|
| *F16F 9/18* | (2006.01) |
| *B60G 13/08* | (2006.01) |
| *F16F 9/34* | (2006.01) |
| *F16F 9/348* | (2006.01) |
| *F16F 9/36* | (2006.01) |

(52) U.S. Cl.
CPC ............... *F16F 9/18* (2013.01); *F16F 9/348* (2013.01); *F16F 9/366* (2013.01); *B60G 13/08* (2013.01); *B60G 2202/24* (2013.01)

(58) Field of Classification Search
CPC ... F16F 9/18; F16F 9/348; F16F 9/366; B60G 13/08; B60G 2202/24
See application file for complete search history.

(56) References Cited

U.S. PATENT DOCUMENTS

| | | | | |
|---|---|---|---|---|
| 2,327,295 A | * | 8/1943 | Whisler, Jr. | F16F 9/5126 188/320 |
| 2,729,308 A | | 1/1956 | Koski et al. | |
| 3,007,550 A | * | 11/1961 | Long, Jr. | F16F 9/512 188/322.22 |
| 3,450,235 A | * | 6/1969 | Lohr | B60G 17/044 267/64.19 |
| 3,896,908 A | * | 7/1975 | Petrak | F16F 9/5126 188/322.22 |

(Continued)

FOREIGN PATENT DOCUMENTS

DE    102 22 940 C1    7/2003

OTHER PUBLICATIONS

Office Action dated Jan. 6, 2025 for corresponding German Patent Application No. 10 2022 205 133.5, along with an English translation (18 pages).

*Primary Examiner* — Bradley T King
*Assistant Examiner* — James K Hsiao
(74) *Attorney, Agent, or Firm* — Hauptman Ham, LLP

(57) ABSTRACT

An embodiment of the present disclosure relates to a shock absorber. A shock absorber which is divided into a compression chamber and a rebound chamber by a piston valve in a tube having an interior filled with a fluid includes a first elastic member disposed in the compression chamber, a second elastic member disposed in the compression chamber to be spaced apart from the first elastic member, and a mid-guide member disposed between the first elastic member and the second elastic member and movable along a longitudinal direction of the compression chamber.

19 Claims, 9 Drawing Sheets

(56) References Cited

U.S. PATENT DOCUMENTS

| | | | | |
|---|---|---|---|---|
| 4,372,545 A * | 2/1983 | Federspiel | | F16F 9/512 |
| | | | | 267/221 |
| 4,396,098 A * | 8/1983 | Petrak | | F16F 9/512 |
| | | | | 188/315 |
| 4,615,420 A * | 10/1986 | Mourray | | F16F 9/348 |
| | | | | 137/493.9 |
| 4,768,629 A * | 9/1988 | Wossner | | F16F 9/49 |
| | | | | 188/322.22 |
| 4,809,829 A * | 3/1989 | Hummel | | F16F 9/348 |
| | | | | 188/282.5 |
| 4,973,077 A * | 11/1990 | Kuwayama | | B60G 21/0553 |
| | | | | 280/5.511 |
| 5,219,414 A * | 6/1993 | Yamaoka | | F16F 9/516 |
| | | | | 188/322.15 |
| 5,333,708 A | 8/1994 | Jensen et al. | | |
| 6,318,523 B1 * | 11/2001 | Moradmand | | F16F 9/3482 |
| | | | | 188/322.22 |
| 6,814,193 B2 * | 11/2004 | Grundei | | F16F 9/061 |
| | | | | 188/322.22 |
| 8,245,823 B2 * | 8/2012 | Zeissner | | F16F 9/3485 |
| | | | | 188/322.22 |
| 8,590,677 B2 * | 11/2013 | Kim | | F16F 9/5126 |
| | | | | 188/280 |
| 8,978,845 B2 * | 3/2015 | Kim | | F16F 9/5126 |
| | | | | 188/313 |
| 9,091,320 B1 * | 7/2015 | Smith | | F16F 9/48 |
| 9,500,255 B2 * | 11/2016 | Nowaczyk | | F16F 9/512 |
| 9,541,153 B2 * | 1/2017 | Park | | F16F 9/3405 |
| 9,546,707 B2 * | 1/2017 | Kus | | F16F 9/48 |
| 9,611,915 B2 * | 4/2017 | Park | | F16F 9/5126 |
| 9,776,468 B2 * | 10/2017 | Teraoka | | B60G 17/08 |
| 9,834,054 B2 * | 12/2017 | Teraoka | | F16F 9/5126 |
| 9,964,171 B2 * | 5/2018 | Firek | | F16F 9/5126 |
| 10,167,921 B2 * | 1/2019 | Flacht | | F16F 9/585 |
| 10,625,551 B2 * | 4/2020 | Rumpel | | B60G 7/003 |
| 10,683,906 B2 * | 6/2020 | Kus | | F16F 9/49 |
| 10,962,081 B2 * | 3/2021 | Sankaran | | B60G 13/08 |
| 11,181,161 B2 * | 11/2021 | Baldoni | | F16F 9/19 |
| 11,187,299 B1 * | 11/2021 | Mao | | F16F 9/5126 |
| 11,796,024 B2 * | 10/2023 | Baek | | F16F 9/49 |
| 2012/0248670 A1 * | 10/2012 | Yamashita | | F16F 9/49 |
| | | | | 267/226 |
| 2013/0020158 A1 * | 1/2013 | Park | | F16F 9/34 |
| | | | | 188/280 |
| 2013/0056317 A1 * | 3/2013 | Kim | | F16F 9/5126 |
| | | | | 188/275 |
| 2013/0140117 A1 * | 6/2013 | Yu | | F16F 9/5126 |
| | | | | 188/280 |
| 2015/0152938 A1 * | 6/2015 | Park | | F16F 9/3405 |
| | | | | 188/280 |
| 2015/0159727 A1 * | 6/2015 | Park | | F16F 9/5126 |
| | | | | 188/280 |
| 2015/0184716 A1 * | 7/2015 | Teraoka | | F16F 9/585 |
| | | | | 188/297 |
| 2015/0204411 A1 * | 7/2015 | Kus | | F16F 9/3488 |
| | | | | 188/313 |
| 2016/0288604 A1 * | 10/2016 | Teraoka | | B60G 13/08 |
| 2018/0156302 A1 * | 6/2018 | Kus | | F16F 9/585 |
| 2019/0162266 A1 * | 5/2019 | Flacht | | F16F 9/18 |
| 2019/0375263 A1 * | 12/2019 | Knapczyk | | B60G 17/08 |
| 2020/0011395 A1 * | 1/2020 | Sankaran | | F16F 9/49 |
| 2020/0215864 A1 * | 7/2020 | Lizarraga Senar | | B60G 13/08 |
| 2021/0070130 A1 * | 3/2021 | Cheong | | F16F 9/368 |
| 2022/0373057 A1 * | 11/2022 | Baek | | F16F 9/16 |
| 2023/0235806 A1 * | 7/2023 | Cho | | F16F 9/5126 |
| | | | | 188/322.5 |

\* cited by examiner

*210:211,212

SHOCK ABSORBER

CROSS-REFERENCE TO RELATED APPLICATIONS

This application claims benefit and priority to Korean Patent Application No. 10-2021-0067058, filed on May 25, 2021, with the Korean Intellectual Property Office, the disclosure of which is incorporated herein in its entirety by reference.

TECHNICAL FIELD

The present disclosure relates to a shock absorber, and more particularly, to a shock absorber used for a suspension system for a vehicle to adjust a vehicle height.

BACKGROUND

In general, a shock absorber is filled with a fluid therein and generates a damping force that compresses the fluid according to the movement of the piston to perform a buffering operation of a device in which the shock absorber is installed.

Specifically, the shock absorber inhibits or attenuates vibration from the road surface or absorbs vibration energy thereof to protect a driver and loaded cargo. Such a shock absorber is used for a suspension system for a vehicle for the purpose of improving handling performance or riding comfort.

However, when the shock absorber generates the damping force only by using a pressure of the fluid, a size of the shock absorber is increased to increase the damping force, but in this case, there is a large limitation in the degree of freedom of installation of the shock absorber.

Therefore, there is a need for a shock absorber capable of increasing the damping force while keeping the shock absorber compact.

SUMMARY

The present disclosure has been made in an effort to provide a shock absorber capable of using a damping force of the hydraulic pressure made by a fluid and a damping force made by an elastic member during a compression process.

An embodiment of the present disclosure provides a shock absorber which is divided into a compression chamber and a rebound chamber by a piston valve in a tube having an interior filled with a fluid, including a first elastic member disposed in the compression chamber, a second elastic member disposed in the compression chamber to be spaced apart from the first elastic member, and a mid-guide member disposed between the first elastic member and the second elastic member and movable along a longitudinal direction of the compression chamber.

The shock absorber may further include a first guide member disposed to be spaced apart from the mid-guide member to support the first elastic member.

The first guide member may include a first guide body, a first guide support formed so that one region of an outer periphery of the first guide body extends in an outer peripheral direction of the first guide body to support the first elastic member to one side thereof, and a first guide protrusion formed on the other side of the first guide support and having one region formed to protrude in a direction away from the first elastic member.

The shock absorber may further include a body valve disposed below the tube to face the first guide protrusion.

The first guide member may further include a plurality of first guide flow paths formed to pass on the first guide body to be spaced apart from each other.

The shock absorber may further include a disk member supported by the first guide body and having a disk flow path to guide the fluid to flow into the first guide flow path.

The mid-guide member may further include an annular mid-guide body having a mid guide hole formed to pass through a center thereof, a first elastic support groove concavely formed on one side of the mid-guide body to support the first elastic member, and a second elastic support groove concavely formed on the other side of the mid-guide body to support the second elastic member.

The mid-guide member may further include a mid inner peripheral portion disposed between an inner periphery of the first elastic support groove and an outer periphery of the mid-guide hole to be contactable with the disk member.

The shock absorber may further include a second guide member disposed between the piston valve and the second elastic member.

The second guide member may include the second guide body having a second guide hole formed to pass through a center thereof, a second guide groove concavely formed on one side of the second guide body to support the second elastic member, and a plurality of second guide protrusions formed to protrude from the other side of the second guide body and spaced apart from each other toward the piston valve.

The second guide member may include the second guide body having a second guide hole formed to pass through a center thereof, a second guide inner peripheral portion formed so that one region of one side of the second guide body protrudes toward the second elastic member based on the second guide hole, a second engaging protrusion formed so that one region of the second guide body extends in an outer diameter direction of the second guide body based on the second guide inner peripheral portion to support the second elastic member, a plurality of second auxiliary guide protrusions formed to protrude from an outer periphery of the second engaging protrusion in an outer peripheral direction of the second guide body and spaced apart from each other, and a plurality of second guide protrusions formed to protrude from the other side of the second engaging protrusion and spaced apart from each other toward the piston valve.

The second guide member may further include a second guide flow path which is formed between the second guide protrusions to guide the movement of the fluid.

The shock absorber may further include a piston rod configured to support the piston valve, wherein one end of the piston rod may be at least partially insertable into the second guide hole.

One side of the piston valve may be contactable with the second guide protrusion.

When the piston valve is moved in a direction of compressing the first elastic member and the second elastic member, the fluid in one region of the compression chamber in which the second elastic member is disposed may be moved to the outside of the compression chamber between the body valve and the second guide member and through the first guide flow path.

When the mid inner peripheral portion comes into contact with the disk member by the movement of the piston valve, at least some of the fluid in one region of the compression chamber in which the second elastic member is disposed may be moved to the outside of the compression chamber through the second guide flow path.

The first elastic member and the second elastic member may have different elastic moduli.

The first elastic member and the second elastic member may be disposed in series in the compression chamber.

Another embodiment of the present disclosure provides a shock absorber including a tube having an interior filled with a fluid, a piston valve disposed to be movable upward and downward in the tube and divided into a compression chamber below the tube and a rebound chamber above the tube, a body valve disposed below the tube, a mid-guide member disposed in the compression chamber and movable therein, a first region below the mid-guide member, a first elastic member disposed in the first region, a second region below the mid-guide member, a second elastic member disposed in the second region, a first guide member disposed between the body valve and the first elastic member, a disk member supported by the first guide member, a second guide member disposed between the second elastic member and the piston valve and having a second guide flow path formed to guide a movement direction of the fluid in at least a portion of the second region to be changed according to a contact between the mid-guide member and the disk member.

The body valve, the first guide member, and the disk member may be coupled to each other by a body pin and a body nut or a body pin rivet.

According to the embodiments of the present disclosure, the shock absorber generates a damping force by an elastic member as well as a damping force by a fluid during a compression process to reduce its descending speed when descending from the height of the vehicle. Accordingly, the shock absorber according to the embodiment of the present disclosure may improve riding comfort for an operator.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
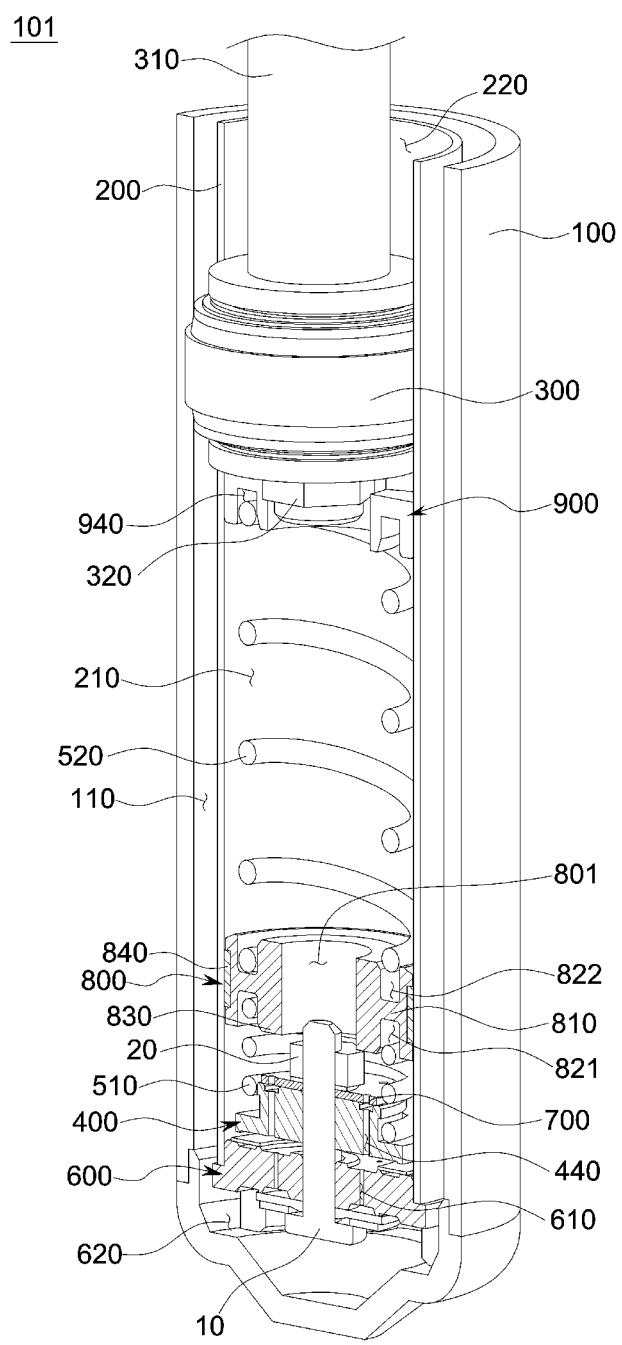
FIG. 1 is a cross-sectional perspective view of a part of a shock absorber according to an embodiment of the present disclosure.

Hereinafter, embodiments of the present disclosure will be described in detail with reference to the accompanying drawings so as to easily implement those with ordinary skill in the art to which the present disclosure pertains. The present disclosure may be implemented in various different forms and is not limited to embodiments described herein.

It is noted that the drawings are schematic, and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics.

Embodiments of the present disclosure illustrate ideal embodiments of the present disclosure in detail. As a result, various modifications of the drawings are expected. Therefore, the embodiments are not limited to specific forms in regions illustrated in the drawings, and for example, include modifications of forms by the manufacture thereof.

Hereinafter, a shock absorber 101 according to an embodiment of the present disclosure will be described with reference to FIGS. 1 to 4 and FIGS. 7 to 9.

Figure 2:
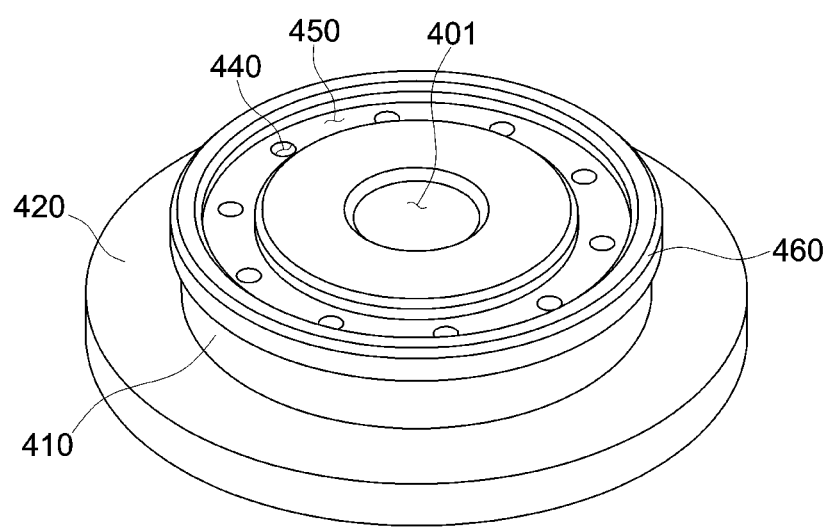
FIG. 2 is a perspective view from the top of a first guide member of FIG. 1.
Figure 3:
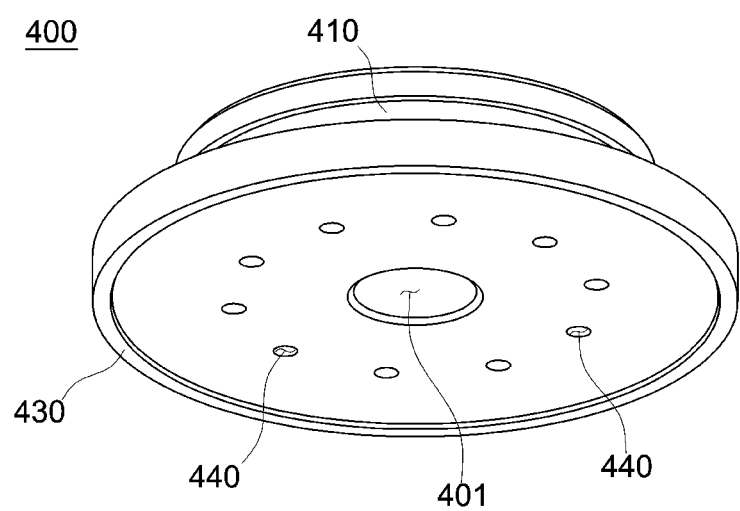
FIG. 3 is a perspective view from the bottom of the first guide member of FIG. 1.

As illustrated in FIGS. 1 to 3, the shock absorber 101 according to the embodiment of the present disclosure includes a tube 200, a piston valve 300, a compression chamber 210, and a rebound chamber 220.

The interior of the tube 200 is filled with a fluid. Specifically, in the shock absorber 101, the inner side of a shock absorber body 100 is disposed in the tube 200. In addition, the inner surface of the shock absorber body 100 is disposed to be spaced apart from the outer surface of the tube 200. A reserve chamber 110 is formed between the inner surface of the shock absorber body 100 and the outer surface of the tube 200.

In the tube 200, the piston valve 300 is movably disposed so that the interior of the tube 200 is divided into the compression chamber 210 and the rebound chamber 220. Specifically, a piston flow path (not illustrated) is formed in the piston valve 300 so that the compression chamber 210 and the rebound chamber 220 communicate with each other. The compression chamber 210 is disposed below the rebound chamber 220 in a longitudinal direction of the tube 200.

For example, the piston valve 300 according to the embodiment of the present disclosure may be formed as a single module.

As illustrated in FIG. 1, the shock absorber 101 according to the embodiment of the present disclosure includes a first elastic member 510, a second elastic member 520, and a mid-guide member 800.

The first elastic member 510 is disposed inside the compression chamber 210. In addition, the first elastic member 510 may be disposed in a first region 211 which is one region in the compression chamber 210.

The second elastic member 520 is spaced apart from the first elastic member 510 in the compression chamber 210. In addition, the second elastic member 520 may be disposed in a second region 212 which is the other region in the compression chamber 210. Specifically, the second elastic member 520 may be disposed above the first elastic member 510 in a longitudinal direction of the first elastic member 510 and the tube 200.

For example, the first elastic member 510 and the second elastic member 520 may be springs.

The mid-guide member 800 may be disposed between the first elastic member 510 and the second elastic member 520. In addition, the mid-guide member 800 is disposed to be movable upward and downward along the longitudinal direction of the interior of the compression chamber 210.

Specifically, the mid-guide member 800 may be moved in a direction moving toward a lower direction of the compression chamber 210 along the moving direction of the piston valve 300. In addition, the mid-guide member 800 may be disposed between the first region 211 and the second region 212. Specifically, the volumes of the first region 211 and the second region 212 may be varied according to the movement of the mid-guide member 800.

By such a configuration, in the shock absorber 101 according to the embodiment of the present disclosure, the first elastic member 510 and the second elastic member 520 are disposed in the compression chamber 210. During a compression process in which the piston valve 300 of the shock absorber 101 moves in a direction in which the first elastic member 510 and the second elastic member 520 are compressed, it is possible to use not only a damping force made by a fluid in the compression chamber 210 but also a damping force made by the first elastic member 510 and the second elastic member 520.

Accordingly, when the shock absorber 101 according to the embodiment of the present disclosure is applied to a vehicle, not only the damping force made by the fluid in the compression chamber 210 but also the damping force made by the first elastic member 510 and the second elastic member 520 may be used. Accordingly, it is possible to stabilize the posture of the vehicle by generating a hydraulic pressure in a particular vehicle height. In addition, even when bumps or pot holes are formed on the road surface, the vehicle may be controlled stably without a large motion change. In addition, the shock absorber 101 according to the embodiment of the present disclosure may stably maintain the posture of the vehicle even when the vehicle is rapidly steered.

As illustrated in FIGS. 1 to 3, the shock absorber 101 according to the embodiment of the present disclosure may further include a first guide member 400.

The first guide member 400 may be spaced apart from the mid-guide member 800. In addition, the first guide member 400 may support the second elastic member 520. In addition, the first guide member 400 controls the movement of the fluid to the outside of the compression chamber 210 according to the compression state of the first elastic member 510.

That is, the first guide member 400 may adjust the flow rate of the fluid moving from the interior of the compression chamber 210 to the outside of the compression chamber 210 according to the compression state of the first elastic member 510, during the compression process.

Accordingly, in the shock absorber 101 according to the embodiment of the present disclosure, the first guide member 400 may adjust the flow rate of the fluid moved to the outside of the compression chamber 210 according to the compression state of the first elastic member 510 to generate the hydraulic pressure along the fluid moving to the outside of the compression chamber 210, thereby reducing a descending speed of the piston valve 300 of the shock absorber 101.

The first guide member 400 according to the embodiment of the present disclosure, as illustrated in FIGS. 2 and 3, may include a first guide body 410, a first guide support 420, and a first guide protrusion 430.

The first guide body 410 is disposed in the compression chamber 210. Specifically, the first guide body 410 may have a first guide hole 401 formed to pass through the center thereof. That is, the first guide body 410 may be formed in an annular shape.

For example, the first guide body 410 may be disposed in the first region 211.

The first guide support 420 may be formed so that an outer peripheral region of the first guide body 410 extends in an outer peripheral direction of the first guide body 410. One side of the first guide support 420 may support one side of the first elastic member 510. That is, the outer diameter of the first guide support 420 may be relatively larger than the outer diameter of the first guide body 410 in which no teeth are formed.

One region of the first guide protrusion 430 may protrude from the other side of the first guide support 420 in a direction away from the first elastic member 510. Specifically, the first guide protrusion 430 may protrude in a direction in which one region adjacent to the side surface of the first guide support 420 among the other sides of the first guide support 420 is away from the other side of the first guide support 430. The first guide protrusion 430 may protrude in an annular shape along the outer diameter of the first guide support 420.

Accordingly, in the shock absorber 101 according to the embodiment of the present disclosure, the first elastic member 510 may be repeatedly compressed and expanded to effectively prevent the first elastic member 510 from being separated from the first guide member 400.

As illustrated in FIGS. 1 to 4, the shock absorber 101 according to the embodiment of the present disclosure may further include a body valve 600.

The body valve 600 may be disposed below the tube 200. Specifically, the body valve 600 may control the fluid of the compression chamber 210 to be moved to the reserve chamber 110. Specifically, a body valve through-hole 610 may be formed to pass through a central portion of the body valve 600. In addition, body discharge holes 620 disposed to be spaced apart from each other along the outer diameter of the body valve 600 may be formed in a side surface of a lower portion of the body valve 600. Specifically, the lower portion of the body valve 600 may have body discharge holes 620 of which the outer peripheral surface extending along the longitudinal direction and an end at the lower portion of the outer peripheral surface thereof is opened.

Since the first guide member 400 includes the first guide protrusion 430 to effectively support a gap between the first guide member 400 and the body valve 600 without a separate washer between the body valve 600 and the first guide member 400.

As illustrated in FIGS. 1 to 3, the first guide member 400 according to the embodiment of the present disclosure may further include a first guide flow path 440.

A plurality of first guide flow paths 440 may be formed to pass through the first guide body 410 to be spaced apart from each other. The first guide flow paths 440 may be disposed to be spaced apart from each other along a circumferential direction on the first guide body 410. Specifically, the first guide flow path 440 may be formed to communicate with a first guide groove 450 concavely formed on the upper surface of the first guide body 410 along the circumferential direction.

The fluid in the compression chamber 210 may be moved to the body valve 600 through the first guide flow path 440.

As illustrated in FIG. 1, in the body valve 600 according to the embodiment of the present disclosure, a plurality of body valve flow paths 610 that are spaced apart from each other and formed to pass therethrough may be formed. The body valve flow path 610 may guide a fluid passing between the other side of the first guide support 420 and the upper surface of the body valve 600 and a fluid passing through the first guide flow path 440 to move to the reserve chamber 110.

That is, the body valve flow path 610 may be disposed to communicate with the first guide flow path 440.

The body valve flow path 610 is formed to communicate with the body discharge hole 620 so that the fluid passing through the body valve flow path 610 may move to the reserve chamber 110 through the body discharge hole 620.

As illustrated in FIGS. 1 to 4, the shock absorber 101 according to the embodiment of the present disclosure may further include a disk member 700 formed with a disk flow path 710.

The disk member 700 may be formed in an annular shape in which a disk through-hole 701 is formed. In addition, the disk member 700 may be supported on the first guide body 410. In addition, a plurality of disk flow paths 710 spaced apart from each other with respect to the disk through-hole 701 may be formed in the disk member 700.

One surface of the disk member 700 may be disposed to cover the first guide groove 450. That is, during the compression process of the shock absorber 101, the fluid flowing into through the disk flow path 710 passes through the first guide groove 450 to move along the first guide flow path 440 and the body valve flow path 610.

Accordingly, the disk flow path 710 reduces the resistance between the fluid and the disk member 700 and may guide the fluid to move effectively to the first guide flow path 440, during the compression process of the shock absorber 101.

Specifically, when the mid-guide member 800 does not come into contact with the disk member 700 during the compression process of the shock absorber 101, the fluid may be moved to the outside of the lower portion of the compression chamber 210 between the lower portion of the first guide member 400 and the upper portion of the body valve 600 and through the first guide flow path 440.

Thereafter, when the mid-guide member 800 comes into contact with the disk member 700 during the compression process of the shock absorber 101, the fluid may be moved to the outside of the lower compression chamber 210 through the disk flow path 710 and the first guide flow path 440.

That is, according to the contact between the mid-guide member 800 and the disk member 700, the flow rate and path through which the fluid in the compression chamber 210 moves to the outside of the compression chamber 210 may be changed.

Figure 4:
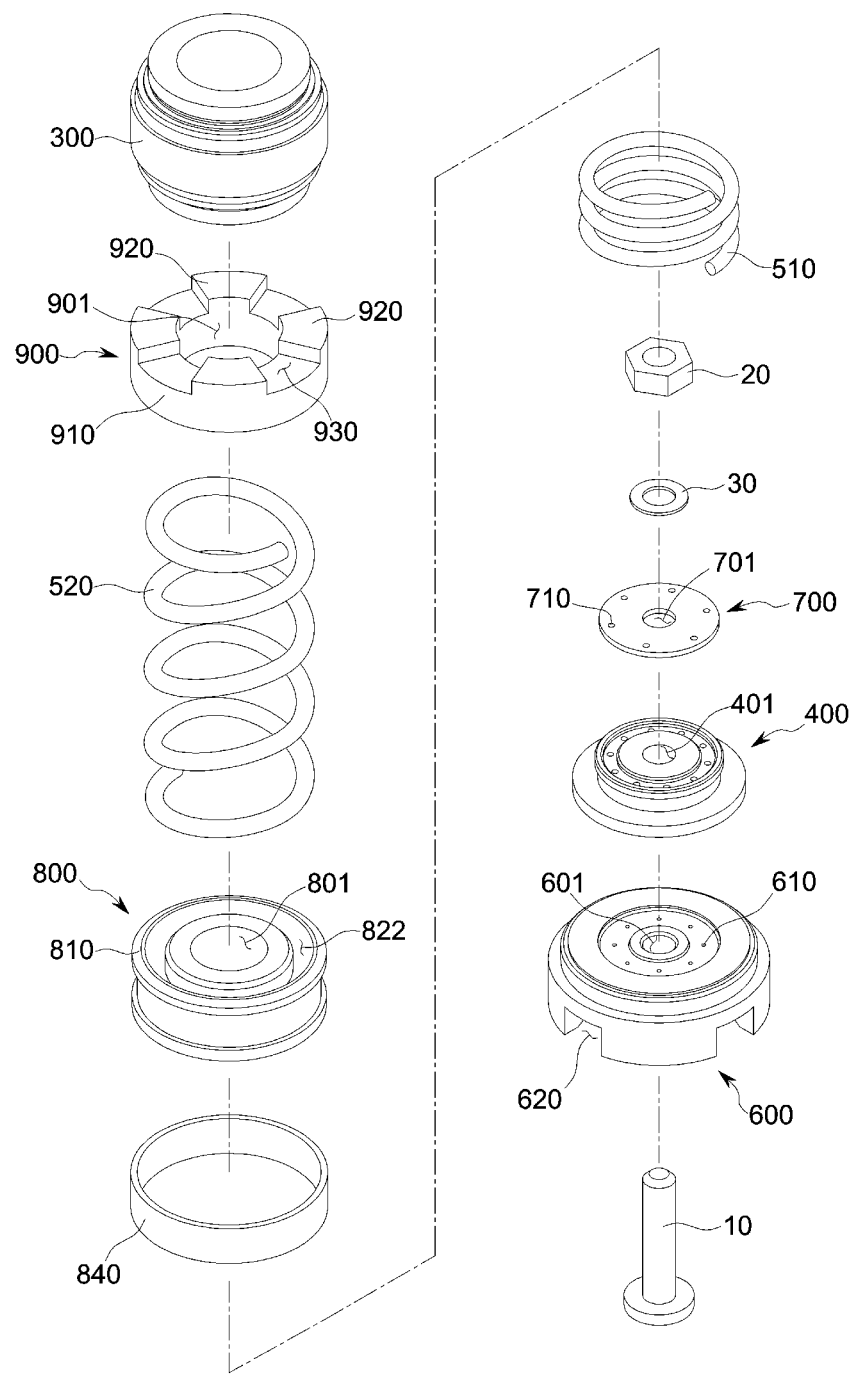
FIG. 4 is an assembly view of a configuration disposed inside a tube of FIG. 1.

The mid-guide member 800 according to the embodiment of the present disclosure, as illustrated in FIGS. 1 and 4, may include a mid-guide body 810, a first elastic support groove 821, and a second elastic support groove 822.

The mid-guide body 810 may be formed in an annular shape to have a mid-guide hole 801 formed to pass through the center thereof. The fluid may be moved between the first region 211 and the second region 212 through the mid-guide hole 801. That is, the fluid of the second region 212 may be moved to the first region 211 through the mid-guide hole 801.

The first elastic support groove 821 may be concavely formed on one side of the mid-guide body 810 in the circumferential direction. In addition, the first elastic support groove 821 may support the other side of the first elastic member 510. Accordingly, the other side of the first elastic member 510 is supported by the first elastic support groove 821, and one side thereof is supported by the first guide support part 420, thereby effectively preventing separation. Specifically, the first elastic support groove 821 may be formed below the mid-guide body 810.

The second elastic support groove 822 may be concavely formed on the other side of the mid-guide body 810 in the circumferential direction. In addition, the second elastic support groove 822 may support one side of the second elastic member 520. Accordingly, the mid-guide member 800 may be moved together according to the compression of the second elastic member 520. Specifically, the second elastic support groove 822 may be formed above the mid-guide body 810.

Figure 5:
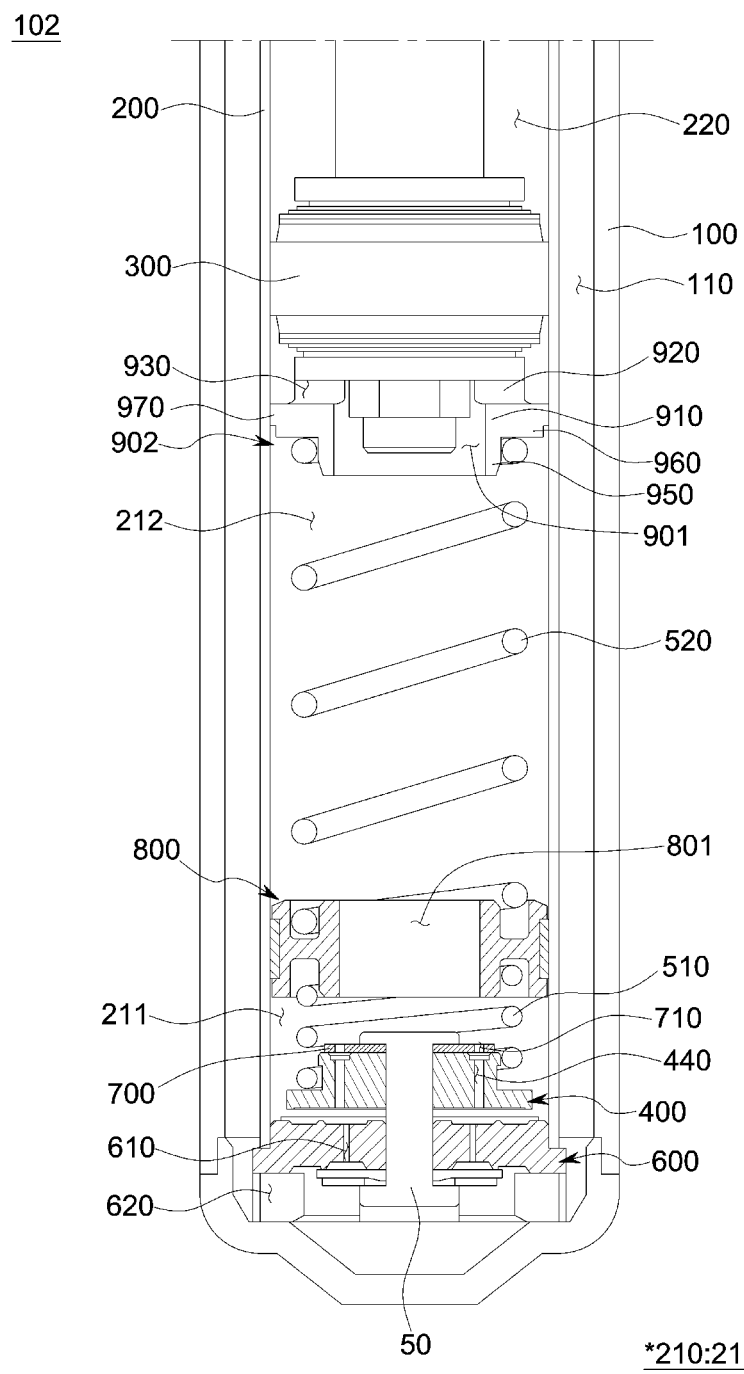
FIG. 5 is a cross-sectional view of a part of a shock absorber according to another embodiment of the present disclosure.

Accordingly, as illustrated in FIGS. 1 and 5, the mid-guide member 800 according to the embodiment of the present disclosure supports the first elastic member 510 and the second elastic member 520, and may guide the movement of the fluid between the region 211 and the second region 212.

The mid-guide member 800 according to the embodiment of the present disclosure, as illustrated in FIG. 1, may further include a mid inner peripheral portion 830.

The mid inner peripheral portion 830 may be disposed between the inner periphery of the first elastic support groove 821 and the outer periphery of the mid-guide hole 801. In addition, the mid inner peripheral portion 830 may be disposed below the mid-guide body 810 to face the disk member 700. In addition, during the compression process of the shock absorber 101, the mid inner peripheral portion 830 and the disk member 700 may come into contact with each other according to the compression state of the first elastic member 510.

Specifically, during the compression process of the shock absorber 101, when the mid inner peripheral portion 830 comes into contact with the disk member 700, the fluid may be moved to the outside of the lower compression chamber 210 through the disk flow path 710 and the first guide flow path 440.

As illustrated in FIGS. 1 to 4, the shock absorber 101 according to the embodiment of the present disclosure may further include a second guide member 900.

The second guide member 900 may be disposed between the piston valve 300 and the second elastic member 520. Specifically, the second guide member 900 may be disposed between the lower portion of the piston valve 300 and the other side of the second elastic member 520. The second guide member 900 may be moved while being pressed by the piston valve 300, during the compression process of the shock absorber 101.

That is, the second guide member 900 may transfer the movement of the piston valve 300 to the second elastic member 520.

The second guide member 900 according to the embodiment of the present disclosure, as illustrated in FIGS. 1 and 4, may include a second guide body 910, a second guide groove 940, and a second guide protrusion 920.

The second guide body 910 may be formed in an annular shape to have a second guide hole 901 formed to pass through the center thereof. In addition, the second guide body 910 may be disposed so that the outer peripheral surface is movable in the compression chamber 210 along the inner peripheral surface of the tube 200.

The second guide groove 940 may be concavely formed on one side of the second guide body 910 to support the second elastic member 520. Accordingly, one side of the second elastic member 520 is supported by the second elastic support groove 822, and the other side thereof may be supported by the second guide groove 940. Specifically, the second guide groove 940 may be formed below the second guide body 910.

A plurality of second guide protrusions 920 may be formed to protrude from the other side of the second guide body 910 to be spaced apart from each other toward the piston valve 300. Specifically, an upper portion of the second guide protrusion 920 may be formed to have a flat surface. The plurality of second guide protrusions 920 may be disposed to be spaced apart from each other in the circumferential direction with respect to a second guide hole 901.

The upper surface of the second guide protrusion 920 may come into contact with one side of the piston valve 300. Accordingly, the second guide protrusion 920 may be reduced to a contact area with one side of the piston valve 300 to reduce effectively noise generated due to the contact between the one side of the piston valve 300 and the second guide member 900.

As illustrated in FIGS. 2 to 4, the first guide member 900 according to the embodiment of the present disclosure may further include a second guide flow path 930.

The second guide flow path 930 may be formed between the second guide protrusions 920 to guide the movement of the fluid. The second guide flow path 930 may be formed between the plurality of second guide protrusions 920 to allow the fluid in the second region 212 to move to the outside of the second region 212. Specifically, the second guide flow path 930 may be formed by a difference in height in which the second guide protrusion 920 protrudes from the second guide body 910. That is, the fluid may move through the second guide flow path 930 of the upper surface of the second guide body 910 in which the second guide protrusion 920 is not formed.

For example, during the compression process of the shock absorber 101, when the mid inner peripheral portion 830 comes into contact with the disk member 700, the fluid may be moved to the outside of the lower compression chamber 210 through the disk flow path 710 and the first guide flow path 440. At this time, the fluid in the second region 212 in which the second elastic member 520 is installed may be moved to the outside of the upper compression chamber 210 through the second guide flow path 930. In addition, the fluid that has passed through the second guide flow path 930 may be moved to the rebound chamber 220 through the flow path of the piston valve 300 (not illustrated).

As illustrated in FIGS. 1, 4, and 5, the shock absorber 101 according to the embodiment of the present disclosure may further include a piston rod 310.

The piston rod 310 may support the piston valve 300. Specifically, one end of the piston rod 310 may pass through the piston valve 300 and the piston rod 310 and the piston valve 300 may be coupled to each other by a piston nut 320. That is, the piston nut 320 may prevent the piston valve 300 from being separated from the piston rod 310.

At least a portion of one end of the piston rod 310 may be inserted into the second guide hole 901. Accordingly, when the piston valve 300 comes into contact with the second guide protrusion 920, one end of the piston rod 310 may be inserted into the second guide hole 901. Accordingly, it is possible to limit the left and right movement of one end of the piston rod 310 according to a protrusion height of the second guide protrusion 920.

The linear motion of the piston valve 300 and the piston rod 310 may be effectively transmitted to the second elastic member 520 and the first elastic member 510 through the second guide member 900.

The first elastic member 510 and the second elastic member 520 of the shock absorber 101 according to the embodiment of the present disclosure may be disposed in series in the compression chamber 210.

The second elastic member 520 may be disposed more adjacent to the body valve 600 than the first elastic member 510. In addition, the first elastic member 510 and the second elastic member 520 may be disposed to be spaced apart from each other based on the mid-guide member 800 in series along the longitudinal direction of the compression chamber 210.

Accordingly, during the compression process of the shock absorber 101 in which the body valve 600 moves in the downward direction of the tube 200, a damping force may be generated from the fluid in the first elastic member 510 and the second elastic member 520 and the compression chamber 210.

The first elastic member 510 and the second elastic member 520 of the shock absorber 101 according to the embodiment of the present disclosure may have different elastic moduli.

In consideration of the area where the shock absorber 101 is installed and the damping force, response sensitivity, and the like to be provided, the elastic moduli of the first elastic member 510 and the second elastic member are determined when designing the shock absorber 101 to be selectively manufactured. Accordingly, it is possible to adjust the damping force of the shock absorber 101 only by changing the first elastic member 510 and the second elastic member 520 without replacement or addition of separate complicated parts.

As illustrated in FIG. 4, the shock absorber 101 according to the embodiment of the present disclosure may further include a body pin 10, a retainer 30, and a body nut 20.

The retainer 30 may be disposed on the disk member 700 relatively adjacent to the mid-guide member 800. Specifically, the retainer 30 is formed in an annular shape having a through-hole of the retainer formed in the center thereof, and may be disposed on the upper surface of the disk member 700 so as not to interfere with the disk flow path 710 formed in the disk member 700.

The body pin 10 may be disposed so that a head having a relatively large diameter is disposed below the body valve 600, and the body pin 10 in the longitudinal direction passes sequentially through the body valve through-hole 610, the first guide hole 401, the disk through-hole 701 and the through-hole of the retainer 30. In addition, a spiral is formed at one end of the body pin 10 passing through the through-hole of the retainer 30, and the body nut 20 may be coupled to the body pin 10.

The body nut 20 and the body pin 10 may allow the body valve 600, the first guide member 400, the disk member 700, and the retainer 30 to be coaxially coupled to each other.

The outer diameter of the body nut 20 may be formed smaller than the inner diameter of the mid-guide hole 801 in consideration of the interference between the mid-guide hole 801 and the body nut 20 when the mid-guide member 800 and the disk member 700 are in contact with each other.

Accordingly, the body valve 600, the first guide member 400, the disk member 700, and the retainer 30 may be coupled to each other by the body pin 10 to be compactly installed on the lower side of the tube 200. That is, due to the shape of the first guide member 400 and the components coupled by the body pin 10, the shock absorber may be effectively used as a section for compression of the first elastic member 510 compared to a conventional shock absorber. In addition, as illustrated in FIGS. 1 and 4, the shock absorber 101 according to the embodiment of the present disclosure may further include a piston ring 840.

The piston ring 840 may be disposed on the outer peripheral surface of the mid-guide body 810 to effectively move the mid-guide member 800 to be movable upward and downward in the tube 200. Specifically, a receiving groove is formed on the outer peripheral surface of the mid-guide body 810 so that at least a part of the piston ring 840 is inserted, and the piston ring 840 is inserted and supported to the receiving groove, and the mid-guide member 800 may be supported and moved upward and downward on the inner wall of the compression chamber 210.

Specifically, the mid-guide member 800 has a piston ring 840 that faces the inner peripheral surface of the tube 200 and is movable upward and downward along the inner peripheral surface of the tube 200 to allow the movement of the fluid to the first region 211 and the second region 212 only through the mid-guide hole 801. In addition, as the piston ring 840 moves along the inner wall of the tube 200 to block the movement of the fluid to the first region 211 and the second region 212 through the outer peripheral surface of the mid-guide member 800.

As illustrated in FIGS. 1 to 3, the first guide member 400 the shock absorber 101 according to the embodiment of the present disclosure may further include a first auxiliary guide support 460.

The first auxiliary guide supports 460 may be disposed to be spaced apart from each other in the height direction of the first guide support 420 and the first guide body 410. In addition, the first auxiliary guide support 460 may be formed so that one region of the upper portion of the first guide support 420 extends in the outer peripheral direction of the first guide body 410.

One side of the first elastic member 510 is supported between the first auxiliary guide support 460 and the first guide support 420 to prevent the first elastic member 510 from being separated. For example, the first auxiliary guide support 460 may prevent the first elastic member 510 from being separated during the expansion, and the first guide support 420 may prevent the first elastic member 510 from being separated during the compression. That is, the inner diameter of one side of the first elastic member 510 is caught between the first auxiliary guide support 460 and the first guide support 420 to effectively prevent the first elastic member 510 from being separated during the compression and expansion.

Specifically, the outer diameter of the first auxiliary guide support 460 may be formed to be relatively smaller than the outer diameter of the first guide support 420.

Alternatively, as illustrated in FIG. 5, a shock absorber 102 according to another embodiment of the present disclosure may include a body pin rivet 50, which is partially different from the shock absorber 101 according to the embodiment of the present disclosure described above that includes the body pin 10 and the body nut 20.

The shock absorber 102 according to another embodiment of the present disclosure may operate with the same configuration and operation process except for the body pin 10 and the body nut 20 of the shock absorber 101 according to the embodiment of the present disclosure described above.

The body pin rivet 50 may have one side disposed below the body valve 600, and may have the other side which is disposed to pass sequentially through the body valve through-hole 610, the first guide hole 401, the disk through-hole 701 and the through-hole of the retainer 30. In addition, the body pin rivet 50 may be subjected to a riveting process. Accordingly, the body valve 600, the first guide member 400, the disk member 700, and the retainer 30 may be coupled to each other by the body pin rivet 50. A configuration formed of such a single module may be disposed below the tube 200.

Alternatively, as illustrated in FIG. 5, the shock absorber 102 according to another embodiment of the present disclosure may further include a second guide member 902. The shock absorber 102 according to another embodiment of the present disclosure has only a configuration of the second guide member 902 which is different from the shock absorber 101 according to the embodiment of the present disclosure and may have the remaining configurations which may be formed in the same manner as the shock absorber 101 according to the embodiment of the present disclosure.

Figure 6:
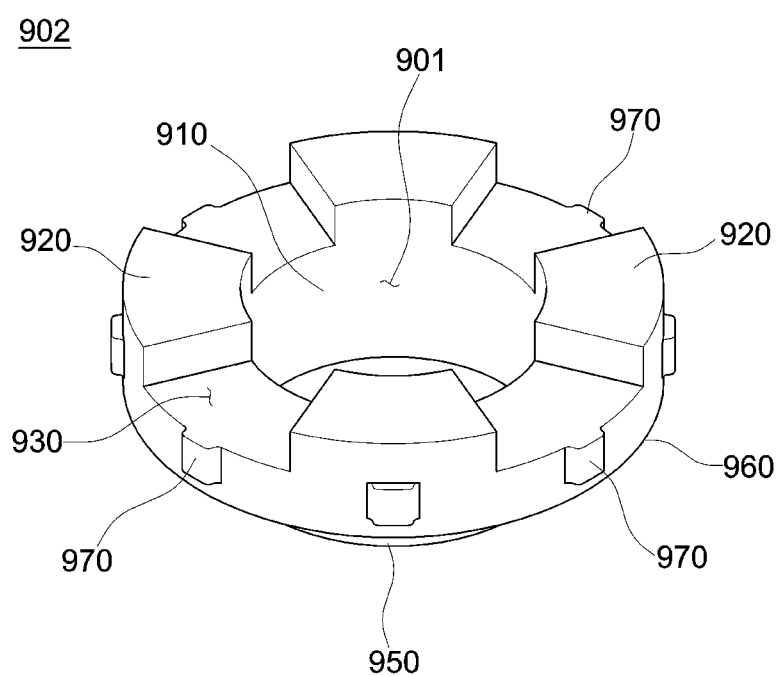
FIG. 6 is a perspective view of a second guide member according to another embodiment of the present disclosure.

As illustrated in FIGS. 5 and 6, the second guide member 902 may include a second guide body 910, a second guide inner peripheral portion 950, a second engaging protrusion 960, a second auxiliary guide protrusion 970, a second guide protrusion 920, and a second guide flow path 930.

The second guide body 910 may be formed in an annular shape to have a second guide hole 901 formed to pass through the center thereof.

The second guide inner peripheral portion 950 may be formed so that a region of one side of the second guide body 910 surrounding the second guide hole 901 protrudes along the longitudinal direction of the tube 200 on which the second elastic member 520 is disposed. That is, the second guide inner peripheral portion 950 may be formed so that a region of one side of the second guide body 910 protrude toward the second elastic member 520 based on the second guide hole 901.

The second engaging protrusion 960 may be formed so that a region of the second guide body 910 extends in an outer diameter direction of the second guide inner peripheral portion 950. Specifically, the outer diameter of the second engaging protrusion 960 may be formed to be relatively larger than the outer diameter of the second guide inner peripheral portion 950. The second elastic member 520 may be supported on the second engaging protrusion 960. Specifically, one side of the second elastic member 520 is supported by the second elastic support groove 822 of the mid-guide member 800, and the inner side of the second elastic member 520 may be supported by the second engaging protrusion 960. Accordingly, the second engaging protrusion 960 may effectively prevent the second elastic member 520 from being separated.

The inner periphery of the second elastic member 520 may be disposed to surround the second guide inner peripheral portion 950. Accordingly, the second guide inner peripheral portion 950 may effectively support the second elastic member 520 while preventing the second elastic member 520 from being separated from side to side even during compression and expansion.

A plurality of second auxiliary guide protrusions 970 may protrude from the outer periphery of the second engaging protrusion 960 to be spaced apart from each other along the outer periphery thereof. Specifically, the second auxiliary guide protrusion 970 may be formed to protrude toward the inner wall of the tube 200. The second auxiliary guide protrusion 970 may allow the second guide member 902 to be effectively moved upward and downward along the inner wall of the second guide member 902 of the tube 200 to prevent the second elastic member 520 from being buckled when the second elastic member 520 comes into contact with the second guide member 902 by the movement of the piston valve 300 to press the second elastic member 520. That is, the second auxiliary guide protrusion 970 may effectively guide the movement of the second guide member 902 along a central direction in the tube 200. In addition, the second auxiliary guide protrusion 970 may effective reduce the frictional force with the tube 200.

A plurality of second guide protrusions 920 may be formed to protrude from the other side of the second engaging protrusion 960 to be spaced apart from each other toward the piston valve 300. The upper surface of such a second guide protrusion 920 may come into contact with the piston valve 300.

The second guide flow path 930 may be formed between the second guide protrusions 920 to guide the movement of the fluid. The second guide flow path 930 may be formed between the plurality of second guide protrusions 920 to allow the fluid in the second region 212 to move to the outside of the second region 212. Specifically, the second guide flow path 930 may be formed by a difference in height in which the second guide protrusion 920 protrudes from the second guide body 910. That is, the fluid may move through the second guide flow path 930 of the upper surface of the second guide body 910 in which the second guide protrusion 920 is not formed. Hereinafter, a compression process of the shock absorber 101 according to the embodiment of the present disclosure will be described with reference to FIGS. 7 to 9.

Figure 7:
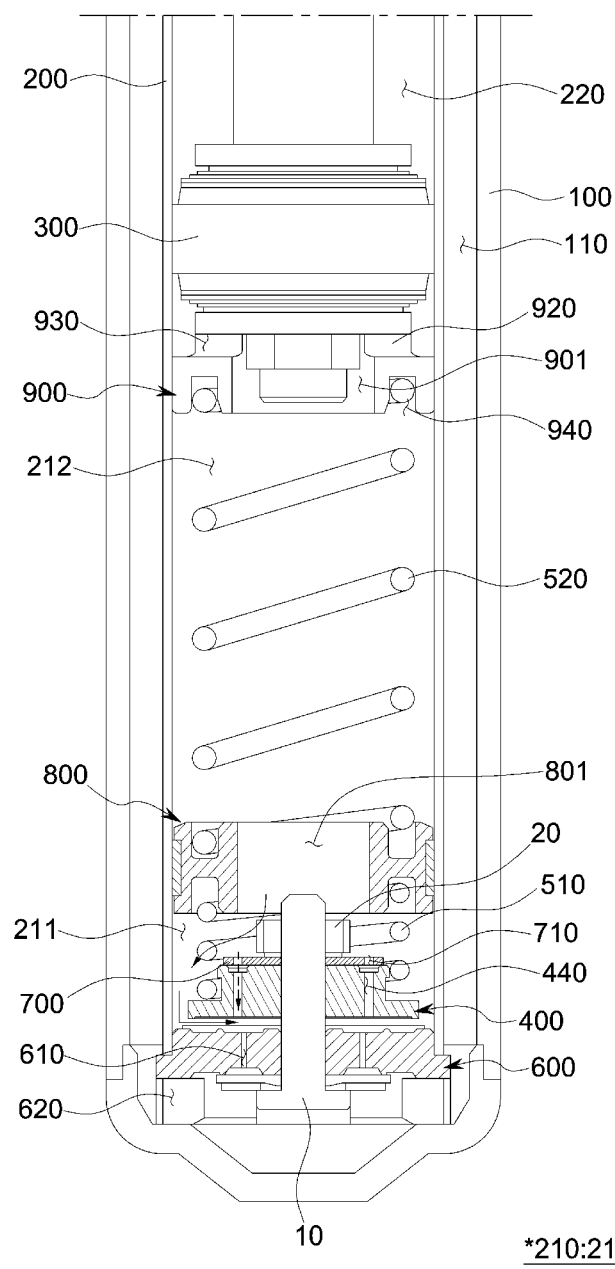
FIGS. 7 to 9 are views illustrating a compression process of the shock absorber of the present disclosure.

When the compression process of the shock absorber 101 starts, as illustrated in FIG. 7, the piston valve 300 presses the second guide member 900 and moves in a direction of compressing the first elastic member 510 and the second elastic member. At this time, the fluid in the compression chamber 210 passes through the body valve flow path 610 through the lower portion of the first guide member 400 and the upper portion of the body valve 600 to move to the reserve chamber 110. In addition, the fluid in the compression chamber 210 passes through the disk flow path 710, the first guide flow path 440, and the body valve flow path 610 to move to the reserve chamber 110.

Figure 8:
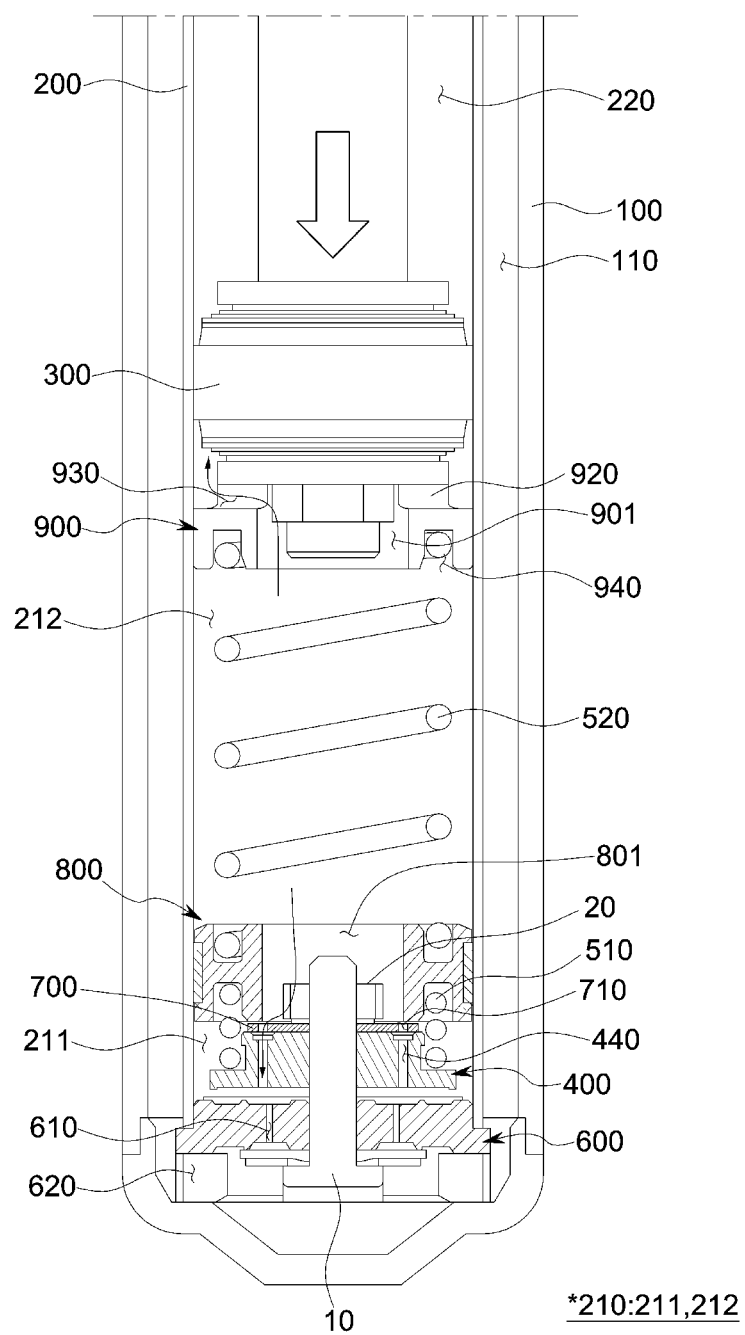

With the continuous compression process of the shock absorber 101, as illustrated in FIG. 8, when the disk member 700 comes into contact with the mid inner peripheral portion 830 of the mid-guide member 800, the fluid in the compression chamber 210 is blocked from moving to the body valve flow path 610 through the lower portion of the first guide member 400 and the upper portion of the body valve 600. At this time, the fluid in the second region 212 of the compression chamber 210 is guided to the body valve flow path 610 through the mid-guide hole 801, the disk flow path 710, and the first guide flow path 440 to generate a hydraulic pressure. Specifically, the fluid from the second region 212 may be moved to the first region 211 through the mid-guide hole 801.

The fluid in the second region 212 is moved to the outside of the compression chamber 210 through the second guide flow path 930, and such a fluid may be moved to the rebound chamber 220 through a flow path (not illustrated) of the piston valve 300.

That is, with the continuous compression stroke of the shock absorber 101, when the mid inner peripheral portion 830 of the mid-guide member 800 comes into contact with the disk member 700, at least some of the fluid in the second region 212 is moved to the rebound chamber 220 through the second guide flow path 930 by changing the flow of movement, or the remaining fluid in the second region 212 may be moved to the reserve chamber 110 through the body valve flow path 610 by maintaining the flow of movement.

Figure 9:
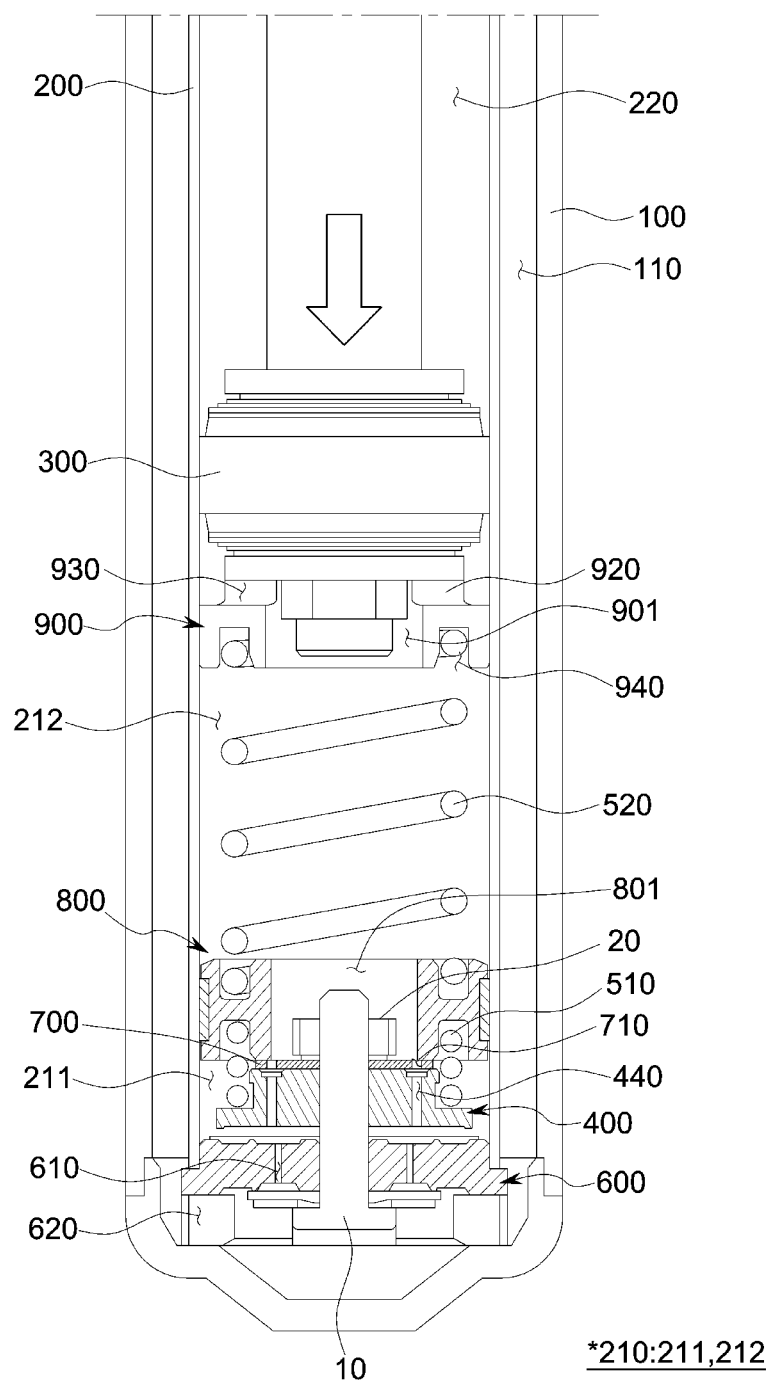

FIG. 9 is a view illustrating a state in which the compression process of the shock absorber 101 is completed.

By changing such a hydraulic pressure and the flow of the fluid, the shock absorber 101 may reduce the descending speed of the vehicle height when the vehicle height descends at a particular point in time. Specifically, as illustrated in FIGS. 7 to 9, the shock absorber 101 according to the embodiment of the present disclosure may perform a hydraulic compression stopper capable of generating not only a damping force made by the hydraulic pressure but also a compression damping force made by the elastic member.

As such, according to the operation process, the shock absorber 101 may generate damping forces even by the first elastic member 510 and the second elastic member 520 as well as the hydraulic pressure during the compression process. Thus, it is possible to stabilize the posture of the vehicle by generating the hydraulic pressure in a particular vehicle height. In addition, even in a state where bumps or pot holes are formed on the road surface to give a shock to the vehicle, the shock absorber 101 according to the embodiment of the present disclosure may generate the damping forces made by the hydraulic pressure and the elastic member, so that it is possible to effectively control the posture of the vehicle even under the road surface condition. In addition, the shock absorber 101 may generate the damping forces made by the hydraulic pressure and the elastic member, so that it is possible to stably maintain the posture of the vehicle even when the vehicle is rapidly steered.

In the same manner as the compression process of the shock absorber 101 according to the embodiment of the present disclosure described above, the shock absorber 102 according to another embodiment of the present disclosure may also perform a compression process. Hereinabove, the embodiments of the present disclosure have been described with the accompanying drawings, but it can be understood by those skilled in the art that the present disclosure can be executed in other detailed forms without changing the technical spirit or requisite features of the present disclosure.

Therefore, the embodiments described as above are exemplary in all aspects and should be understood as not being restrictive and the scope of the present disclosure is represented by claims to be described below rather than the detailed description, and it is to be interpreted that the meaning and scope of the claims and all the changes or modified forms derived from the equivalents thereof come within the scope of the present disclosure.

What is claimed is:

1. A shock absorber which is divided into a compression chamber and a rebound chamber by a piston valve in a tube having an interior filled with a fluid, the shock absorber comprising:
   a first elastic member disposed in the compression chamber;
   a second elastic member disposed in the compression chamber to be spaced apart from the first elastic member;
   a mid-guide member disposed between the first elastic member and the second elastic member and movable along a longitudinal direction of the compression chamber; and
   a second guide member disposed between the piston valve and the second elastic member,
   wherein the second guide member comprises:
      a second guide body having a second guide hole formed to pass through a center thereof;
      a second guide groove concavely formed on one side of the second guide body to support the second elastic member; and
      a plurality of second guide protrusions formed to protrude from the other side of the second guide body and spaced apart from each other toward the piston valve.

2. The shock absorber of claim 1, further comprising:
a first guide member disposed to be spaced apart from the mid-guide member to support the first elastic member.

3. The shock absorber of claim 2, wherein the first guide member comprises
a first guide body;
a first guide support formed so that one region of an outer periphery of the first guide body extends in an outer peripheral direction of the first guide body to support the first elastic member to one side thereof; and
a first guide protrusion formed on the other side of the first guide support and having one region formed to protrude in a direction away from the first elastic member.

4. The shock absorber of claim 3, further comprising:
a body valve disposed below the tube to face the first guide protrusion.

5. The shock absorber of claim 2, wherein the first guide member further comprises a plurality of first guide flow paths formed to pass on a first guide body and to be spaced apart from each other.

6. The shock absorber of claim 5, further comprising:
a disk member supported by the first guide body and having a disk flow path to guide the fluid to flow into the first guide flow path.

7. The shock absorber of claim 6, wherein the mid-guide member comprises
an annular mid-guide body having a mid guide hole formed to pass through a center thereof;
a first elastic support groove concavely formed on one side of the mid-guide body to support the first elastic member; and
a second elastic support groove concavely formed on the other side of the mid-guide body to support the second elastic member.

8. The shock absorber of claim 7, wherein the mid-guide member further comprises a mid inner peripheral portion disposed between an inner periphery of the first elastic support groove and an outer periphery of the mid-guide hole to be contactable with the disk member.

9. The shock absorber of claim 6, wherein the second guide member comprises
a second guide inner peripheral portion formed so that one region of one side of the second guide body protrudes toward the second elastic member based on the second guide hole;
a second engaging protrusion formed so that one region of the second guide body extends in an outer diameter direction of the second guide body based on the second guide inner peripheral portion to support the second elastic member;
a plurality of second auxiliary guide protrusions formed to protrude from an outer periphery of the second engaging protrusion in an outer peripheral direction of the second guide body and spaced apart from each other; and
a plurality of second guide protrusions formed to protrude from the other side of the second engaging protrusion and spaced apart from each other toward the piston valve.

10. The shock absorber of claim 9, wherein the second guide member further comprises a second guide flow path which is formed between the second guide protrusions to guide the movement of the fluid.

11. The shock absorber of claim 10, wherein when the mid inner peripheral portion comes into contact with the disk member by the movement of the piston valve, at least some of the fluid in one region of the compression chamber in which the second elastic member is disposed is moved to the outside of the compression chamber through the second guide flow path.

12. The shock absorber of claim 5, wherein when the piston valve is moved in a direction of compressing the first elastic member and the second elastic member, the fluid in one region of the compression chamber in which the second elastic member is disposed is moved to the outside of the compression chamber between the body valve and the second guide member and through the first guide flow path.

13. The shock absorber of claim 1, further comprising:
a piston rod configured to support the piston valve,
wherein one end of the piston rod is at least partially insertable into the second guide hole.

14. The shock absorber of claim 1, wherein one side of the piston valve is contactable with the at least one of the second guide protrusions.

15. The shock absorber of claim 1, wherein the first elastic member and the second elastic member have different elastic moduli.

16. The shock absorber of claim 1, wherein the first elastic member and the second elastic member are disposed in series in the compression chamber.

17. A shock absorber comprising:
a tube having an interior filled with a fluid;
a piston valve disposed to be movable upward and downward in the tube and divided into a compression chamber below the piston valve and a rebound chamber above the piston valve;
a body valve disposed below the tube;
a mid-guide member disposed in the compression chamber and movable therein;
a first region below the mid-guide member;
a first elastic member disposed in the first region;
a second region above the mid-guide member;
a second elastic member disposed in the second region;
a first guide member disposed between the body valve and the first elastic member;
a disk member supported by the first guide member; and
a second guide member disposed between the second elastic member and the piston valve and having a second guide flow path formed to guide a movement direction of the fluid in at least a portion of the second region to be changed according to a contact between the mid-guide member and the disk member,
wherein the second guide member further comprises:
a second guide body having a second guide hole formed to pass through a center thereof;
a second guide groove concavely formed on one side of the second guide body to support the second elastic member; and
a plurality of second guide protrusions formed to protrude from the other side of the second guide body and spaced apart from each other toward the piston valve.

18. The shock absorber of claim 17, wherein the body valve, the first guide member, and the disk member are coupled to each other by a body pin and a body nut or a body pin rivet.

19. A shock absorber which is divided into a compression chamber and a rebound chamber by a piston valve in a tube having an interior filled with a fluid, the shock absorber comprising:
a first elastic member disposed in the compression chamber;

a second elastic member disposed in the compression chamber to be spaced apart from the first elastic member; and a mid-guide member disposed between the first elastic member and the second elastic member and movable along a longitudinal direction of the compression chamber, a first guide member disposed to be spaced apart from the mid-guide member to support the first elastic member; and a body valve disposed below to the first guide member, wherein the body valve, the first guide member are coupled to each other by a body pin and a body nut or a body pin rivet;

a second guide member disposed between the piston valve and the second elastic member, wherein the second guide member comprises:

a second guide body having a second guide hole formed to pass through a center thereof;

a second guide groove concavely formed on one side of the second guide body to support the second elastic member; and a plurality of second guide protrusions formed to protrude from the other side of the second guide body and spaced apart from each other toward the piston valve.

* * * * *